US009512041B2

(12) United States Patent
McEvoy et al.

(10) Patent No.: US 9,512,041 B2
(45) Date of Patent: Dec. 6, 2016

(54) CERAMIC MEMBRANES

(75) Inventors: Kevin Paul McEvoy, Ballston Spa, NY (US); Anthony Yu-Chung Ku, Rexford, NY (US); Randall Scott Hagerdon, North Pownal, VT (US); Nicholas Edward Antolino, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 560 days.

(21) Appl. No.: 12/972,105

(22) Filed: Dec. 17, 2010

(65) Prior Publication Data

US 2012/0152843 A1 Jun. 21, 2012

(51) Int. Cl.
| | |
|---|---|
| *B01D 67/00* | (2006.01) |
| *B01D 65/10* | (2006.01) |
| *B01D 71/02* | (2006.01) |
| *C04B 38/00* | (2006.01) |
| *C04B 111/00* | (2006.01) |

(52) U.S. Cl.
CPC ......... *C04B 38/0096* (2013.01); *B01D 65/106* (2013.01); *B01D 65/108* (2013.01); *B01D 67/0046* (2013.01); *B01D 71/025* (2013.01); *B01D 2323/08* (2013.01); *B01D 2323/10* (2013.01); *B01D 2323/283* (2013.01); *C04B 2111/00801* (2013.01)

(58) Field of Classification Search
CPC ............ B01D 2323/08; B01D 2323/10; B01D 2323/283; B01D 65/106; B01D 65/108; B01D 67/0046; B01D 71/025; C04B 38/0096; C04B 2111/00801
USPC ............ 210/490, 500.1, 500.25, 500.26, 506
See application file for complete search history.

(56) References Cited

U.S. PATENT DOCUMENTS

| | | | | |
|---|---|---|---|---|
| 4,250,029 A | * | 2/1981 | Kiser et al. | 210/652 |
| 4,623,364 A | * | 11/1986 | Cottringer et al. | 51/309 |
| 4,968,426 A | * | 11/1990 | Hay | 210/490 |
| 4,983,423 A | | 1/1991 | Goldsmith | |
| 5,030,351 A | * | 7/1991 | Burggraaf | B01D 67/0048 210/500.21 |
| 5,106,502 A | | 4/1992 | Goldsmith | |
| 5,160,617 A | * | 11/1992 | Huis In't Veld | B01D 39/2075 210/490 |
| 6,077,800 A | | 6/2000 | Takahashi et al. | |
| 6,733,636 B1 | | 5/2004 | Heins | |
| 7,077,201 B2 | | 7/2006 | Heins | |
| 7,150,320 B2 | | 12/2006 | Heins | |
| 2002/0107133 A1 | | 8/2002 | Troczynski | |
| 2005/0172811 A1 | | 8/2005 | Oyama et al. | |
| 2005/0279500 A1 | | 12/2005 | Heins | |
| 2006/0032630 A1 | | 2/2006 | Heins | |
| 2008/0093008 A1 | | 4/2008 | Isomura et al. | |
| 2008/0093290 A1 | | 4/2008 | Isomura et al. | |
| 2008/0237919 A1 | * | 10/2008 | Liu et al. | 264/176.1 |
| 2008/0299349 A1 | * | 12/2008 | Gu et al. | 428/137 |
| 2009/0107330 A1 | | 4/2009 | Gu | |
| 2010/0056369 A1 | | 3/2010 | Gu | |
| 2010/0304041 A1 | * | 12/2010 | Fletcher et al. | 427/542 |

FOREIGN PATENT DOCUMENTS

| | | |
|---|---|---|
| EP | 0327687 A2 | 8/1989 |
| EP | 0524678 A1 | 1/1993 |
| WO | WO2010024901 A1 | 3/2010 |

OTHER PUBLICATIONS

McArdle, J. L. and Messing, G. L. (1986), Seeding with γ-Alumina for Transformation and Microstructure Control in Boehmite-Derived α-Alumina. Journal of the American Ceramic Society, 69: C-98-C-101.*

C. Scott Nordahl, Gary L. Messing; Thermal analysis of phase transformation kinetics in a-Al2O3 seeded boehmite and g-Al2O3, Thermochimica Acta 318 (1998) 187-199.*

Masato Kumagai* and Gary L. Messing, Controlled Transformation and Sintering of a Boehmite Sol-Gel by a-Alumina Seeding, J. Am. Ceram. Soc., 68 [91 500-505 (1985).*

J.M. Benito, A. Conesa, F. Rubio, M.A. Rodriguez; Preparation and characterization of tubular ceramic membranes for treatment of oil emulsions, Journal of the European Ceramic Society 25 (2005) 1895-1903.*

Seiichi Taruta, Kiyoshi Okada and Nozomu Otsuka; Journal of the Ceramic Society of Japan 98 [1] 29-35 ( 1990).*

G. Tari, J. M. F. Ferreira, A. T. Fonsecaa and 0. Lyckfeldt, Journal of the European Ceramic Society 18 (1998) 249-253.*

Search Report and Written Opinion from corresponding PCT Application No. PCT/US2011/059932 dated May 9, 2012.

Agrafiotis et al., "Deposition of meso-porous gamma-alumina coatings on ceramic honeycombs by sol-gel methods", Journal of the European Ceramic Society, vol. 22, No. 4, pp. 423-434, Apr. 1, 2002.

(Continued)

*Primary Examiner* — David C Mellon
(74) *Attorney, Agent, or Firm* — Mary Louise Stanford

(57) ABSTRACT

Processes for fabricating ceramic membranes include providing a porous substrate having at least one inner channel extending therethrough and having surfaces defined by porous walls, depositing a coating slurry on surfaces of the inner channel(s), and sintering. Sintering temperatures for the processes range from about 400° C. to 800° C. Coating slurries for use in the processes include a boehmite sol and a colloidal suspension of porous alumina particles.

23 Claims, No Drawings

(56) References Cited

OTHER PUBLICATIONS

Benito et al., "Preparation and characterization of tubular ceramic membranes for treatment of oil emulsions", Journal of the European Ceramic Society, vol. 25, No. 11, pp. 1895-1903, Jul. 1, 2005.
Benito, J.M., Preparation and Characterization of Tubular Ceramic membranes for treatment of oil emulsions, J. European Ceramic Society 25 (2005) 1895-1903.
Chinese Office Action dated Jun. 30, 2014 (Chinese language only).
Chinese Office Action issued in connection with corresponding CN Application No. 201180060690.4 on Feb. 6, 2015.

* cited by examiner

CERAMIC MEMBRANES

BACKGROUND

Ceramic membranes can potentially provide increased value in applications that require robust performance in high temperature and highly corrosive environments. The ability to use a ceramic structure also would allow a process able to defoul or self-cleaning by simply back washing; this cannot be done with polymeric membranes. However, ceramic membranes are typically higher cost relative to polymer membranes, because they are expensive to manufacture in a large volume and maintain reasonable defect control. High volume, inexpensive processes such as extrusion of ceramic structures are inherently inaccurate at producing the controlled structures that are necessary for effective separations. The pore structure of a membrane determines the effective ability of it to filter the desired media or material. In order to work reliably these structures must have tight control or tolerances. The tolerances for defects for good quality gas separation membranes are extremely tight.

Unfortunately, ceramic membranes are prone to defects, including tiny pinholes, during the manufacturing operation. In general, the defect density tends to increase with higher processing speeds. Such defects are undesirable because they are non-selective, that is, they indiscriminately pass undesired components of a feed fluid, and they lower the selectivity of the membrane and result in diminished performance. Current high volume manufacturing processes involve high scrap rates due to the production of parts with high defect rates, and high temperatures associated with ceramic processing (sintering). The elimination of defects is essential to developing high performance composite films that can be economically produced at high speeds. The ability to effectively repair ceramic membranes with a low cost process would be a key enabler for the widespread use of ceramic membranes in a gas separations as well as water separation applications.

BRIEF DESCRIPTION

Briefly, in one aspect, the present invention relates to processes for fabricating defect-free ceramic membranes that may enable high yield defect repair and improve quality while lowering cost of the final product. The processes include providing a porous substrate having at least one inner channel extending therethrough and having surfaces defined by porous walls, depositing a coating slurry on surfaces of the inner channel(s), and sintering. Sintering temperatures for the processes range from about 400° C. to 800° C. Coating slurries for use in the processes include a boehmite sol and a colloidal suspension of porous alumina particles.

In another aspect, the present invention relates to processes for fabricating a ceramic membrane. The processes include providing a porous support having at least one inner channel extending therethrough and having surfaces defined by porous walls, depositing a coating slurry on surfaces of the at least one inner channel, and sintering at a temperature ranging from about 400° C. to 800° C. The coating slurry includes a boehmite sol and a colloidal suspension of porous alumina particles.

In still another aspect, the present invention relates to defect-free ceramic membrane prepared by the membrane fabrication processes.

In yet another aspect, the present invention relates to methods for deoiling water. The methods include providing an oil/water mixture gathered from an oil/water collection well, separating oil from the oil/water mixture to yield an oil product and produced water containing oil, and filtering the produced water through a ceramic membrane according to the present invention.

DETAILED DESCRIPTION

Membrane fabrication processes according to the present invention are particularly useful for repairing defects in ceramic membranes, that is, with porous membrane structures that contain voids that may be relatively large; up to about 50 μm in diameter. It should be noted that note that "diameter" as used in the context of the present application is meant to refer to a cross sectional dimension and, in the case where the cross section is non-circular, is meant to refer to the diameter of a hypothetical circle having the same cross sectional area as that of the non-circular structure. The processes may also be used with defect-free support structures.

In one embodiment of the membrane fabrication processes, a coating slurry is deposited on a inner surfaces of voids of a defective ceramic membrane. The membrane is made up of at least a porous support and one or more thin layers disposed on the support. The support is generally a thick, very porous structure that provides mechanical strength to the membrane element without significant flow resistance. The support may be composed of ceramics, glass ceramics, glasses, metals, and combinations thereof. Examples of these include, but are not limited to,: metals, such as stainless steel or INCONEL™ alloys, metal oxides, such as alumina (e.g., alpha-aluminas, delta-aluminas, gamma-aluminas, or combinations thereof), cordierite, mullite, aluminum titanate, titania, zeolite, ceria, magnesia, silicon carbide, zirconia, zircon, zirconates, zirconia-spinel, spinel, silicates, borides, alumino-silicates, porcelain, lithium alumino-silicates, feldspar, magnesium alumino-silicates, and fused silica. Nominal pore size of the support typically ranges from about 1 to about 10 μm, and in some embodiments, less than about 1 μm, particularly less than about 800 nm.

The defective ceramic membrane also includes a filtration layer on the inner channel surfaces. An optional porous intermediate layer may disposed on the porous support between the porous support and the filtration layer. The surface of the void may be composed of any of the porous support layer, the porous intermediate layer or the filtration layer, and the slurry may be deposited on any or all of these layers which may be exposed on the surface of the voids.

In embodiments of the membrane fabrication processes of the present invention where defect-free support structures are used, the coating slurry is deposited on a porous intermediate layer or directly on the porous support layer to form a filtration layer.

The ceramic membranes or support structures may be a single channel or multi-channel ceramic membrane or a honeycomb monolith, arranged in the configuration of a bundle of single tubes, or a monolith containing multiple channels, or a bundle of monolithic tubes. The multi-channel ceramic membranes and honeycomb monoliths contain multiple parallel passageways or channels between a feed inlet and an outlet. The number, spacing, and arrangement of the inner channel(s) is not critical and is selected in view of the potential application of the membrane.

The coating slurry may be deposited by pumping it through open channels of the substrate under pressure, although in some embodiments, pressure is unnecessary and the slurry may simply continuously flow through the channels, at a non-zero flow rate. In other embodiments, the coating slurry may be pressure infiltrated into the channel(s) with one end of the membrane sealed. Where the coating slurry is pumped through the channels, the flow rate may range from 50 to 500 ml/min, and pressure may range from about 5 to about 50 psi. It should be noted that flow rate and pressure are geometry dependent, and may vary according to particular circumstances. The amount of time required to deposit a continuous or substantially continuous layer also varies; in some embodiments, time for the deposition ranges from about two minutes to about thirty minutes.

The deposited layer is converted to a ceramic oxide by sintering at temperatures up to about 1400° C., although a continuous, defect-free membrane may be formed by sintering at much lower temperatures. It should be noted that the terms "continuous" and "defect-free" mean that the filtration layer substantially covers the inner surface of the channels, and that fluid communication is substantially through pores of the filtration layer. Ther terms do not necessarily mean an absolute absence of defects, but do contemplate a small, finite number of defects, or lack of continuity limited to the number that results in the desired separation from the fluid stream. Temperatures for the sintering step range from about 400° C. to about 800° C., and even from about 450° C. to about 600° C. in some embodiments. The atmosphere under which the membrane is sintered is not critical, and an air atmosphere may used unless other considerations dictate use of another gas. An illustrative heat treatment schedule would be a 6° C./min ramp to 500° C., followed by a four hour hold at 500° C., and 6° C./min quench.

The coating slurry includes a boehmite sol and a colloidal suspension of porous alumina particles, and may additionally include a polymeric binder. The term "colloidal suspension" means that the porous alumina are dispersed evenly in an aqueous phase. The coating slurry may prepared by combining the boehmite sol, an aqueous suspension of the porous alumina, and, optionally, an aqueous solution or dispersion of the polymeric binder. Characteristics of the final alumina layer, including pore size, thickness, surface roughness, and performance as a filter are all adjustable by the slurry composition. The thermal pretreatment regimen, particle size of the alumina powder and ratio of boehmite to alumina may be varied to adjust properties of the deposited layer.

The boehmite sol may be obtained by hydrolysis and condensation of an aluminum alkoxide, and combining the hydrolysis product with a peptizing agent. Suitable aluminum alkoxides include, for example, aluminum tri-sec-butoxide, and aluminum isopropoxide, may be used in particular embodiments. Suitable peptizing agent include inorganic acids, such as nitric acid, hydrochloride acid, and sulfuric acid, and organic acids, such as acetic acid; nitric acid may be used in particular embodiments. Particle size of the boehmite sol ranges from about 50 nm to about 500 nm, particularly about 200 nm to about 300 nm. Particle size of the sol may be controlled with precise use of hydrolysis time and the ratio of peptization acid to alkoxide.

In a particular embodiment, the boehmite sol is prepared by dissolving Aluminum-tri-sec-butoxide in hot water, then peptizing the mixture to set the particle size. Nitric acid is used for the peptization step, and the particle is controlled by the molar concentration as well as the quantity of the acid. This process results in a sol that is 3% to 8% concentration by weight. The particle size range used for this application is 50 nm to 500 nm. Sols for use in the coating slurry may be prepared using 0.5N Nitric and set the particle size to 250 nm at 8% concentration. This product is then used a feed stock for the coating slurry.

The porous alumina particles may be prepared by calcining a porous alumina powder at a temperature ranging from about 800° C. to about 1400° C. Suitable alumina materials are highly reactive aluminum oxides or aluminum oxide hydroxides that are sinterable at low temperatures and have high surface area, such as alpha-alumina powders, gamma-alumina powders, pseudo-gamma alumina powders, and pseudoboehmites, may be used to prepare the porous alumina particles for the colloidal suspension. Examples of suitable porous alumina powders include, but are not limited to, the VERSAL™ alumina powders, available from UOP, particularly VERSAL V-200, V-250, and V-300

The porous alumina particles forms the template for the porous structure of the membrane. To control the pore size, the powder is first thermally processed to set the particle size, morphology and control the reactivity. The thermal process may include open air calcination of the powder in alumina crucibles. The temperature range used is from 250° C. to 1400° C. To fabricate a structure to be used for membranes for use in water treatment, the powder may be thermally treated at 1100° C. This heat treated powder is then ball milled to break up any agglomerated particles. The ball milling is done in a pH controlled water based slurry. The pH is adjusted to less than about 8, particularly from about 3 to about 8, more particularly from about 3 to about 6, and in particular embodiments, to about 5, by addition of nitric acid if necessary. The material is ball milled in a porcelain jar using YSZ media. The time for milling ranges from about twelve hours to as long as 96 hours, or until the desired particle size is reached. A typical time to mill is about fourteen hours, and the colloid resulting from milling may contain about 25-30% solids,v/v.

The coating slurry may also include a polymeric binder. Examples of suitable polymeric binders included, but are not limited to, polyvinyl alcohol (PVA) and polyethylene glycol (PEG), particularly PVA. The polymeric binder is used in the coating process to help set the rheological properties of the coating slurry. The polymeric binder is a film-forming agent as well. The colloid is a water based system, at a pH of 4-5, so a compatible polymer is selected. An example of a suitable PVA polymeric binder is DuPont Elvanol® 75-15. The polymer may be dissolved in hot water to form a binder solution. A concentration of 20% by weight is used in some embodiments to to enable control over the coating solution concentration. This material is combined with the other materials to form the coating slurry.

The coating solution may be fabricated by mixing the boehmite sol and the colloidal suspension of the alumina, and optionally, the polymeric binder. In particular embodiments, weight percent of the coating slurry may be around 20%, with a viscosity of 65 relative to water. This coating slurry is deposited on the inner surfaces of the channel(s) of the support structure by pumping in a recirculating system at low flow rates under moderate pressure for a controlled period of time. An illustrative coating cycle consist of pumping the slurry through the channels at 50 to 500 ml/min, at 5 to 50 psi, for 2 to 30 minutes. Once the coating cycle has completed the channels of the support are cleared using vacuum assisted drainage, and the coating is dried in a 30% to 100% RH chamber heated from 20° C. to 120° C.

Ceramic membranes according to the present invention, including defect-free ceramic membranes and membranes produced according to the membrane fabrication processes of present invention, are characterized by an filtration layer containing alumina particles having a multi-modal particle size distribution. The filtration layer is a continuous or substantially continuous porous alumina layer disposed on a porous substrate having a nominal pore size of less than about 1 μm. The continuous porous alumina layer includes a first population of porous alumina particles and a second population of alumina particles disposed within interstices between the particles of the first population. In some embodiments, the alumina particles of the second population are composed of gamma-alumina.

The porous substrate may include a porous support layer, an intermediate layer, and a filtration layer other than that formed from the coating slurry, or a only porous support layer, and either the intermediate layer or the filtration layer. The continuous porous alumina layer may be disposed within voids of a defective membrane.

The first population of particles has a median particle size of less than about 100 times, particularly about ten times, and more particularly about five times the median particle size of the second population of particles. In some embodiments, median particle size of the second population ranges from about 5 nm to about 500 nm, and in other embodiments, from about 50 nm to about 300 nm. Median particle size of the first population of particles ranges from about 300 nm to about 2000 nm. Maximum nominal pore size of the continuous porous alumina layer ranges from about 100 nm to about 800 nm, while minimum nominal pore size ranges from about 2 nm to about 10 nm.

Thickness of the porous alumina layer may range from about 3 μm to about 21 μm, particularly from about 6 μm to about 12 μm. Volume percent of the first population of particles may be less than about 30 percent of the total volume of the first and second populations, particularly less than about 15 percent of the total volume.

The ceramic membranes prepared by the processes of the present invention may be used for water treatment, particularly for deoiling water resulting from a steam-assisted gravity drilling (SAGD) process. In another aspect, the present invention relates to methods for deoiling water; the methods include providing an oil/water mixture gathered from an oil/water collection well, separating oil from the oil/water mixture to yield an oil product and produced water containing oil and filtering the produced water through the ceramic membranes. Details of methods for treating water as part of a SAGD process are described in U.S. Pat. Nos. 6,733,636; 7,077,201; 7,150,320; US 2005/0279500, and US 2006/0032630, the entire contents of each of which are incorporated by reference.

EXAMPLES

Example 1

The boehmite sol is prepared using a hydrolysis/condensation reaction. High purity water (11.4 liters) is heated to 85° C. Next 1.8 liters of 97% alumina tri-sec-butoxide, (ATSB) is slowly added drop wise to the hot water. The period of time for the addition is 1 hour 45 minutes. The mixture is allowed to reflux at 90° C. for 2 hours. The mixture is then peptized using 65 ml of 1N Nitric acid added directly to the solution. The peptization process occurs during a 12-hour reflux at 95° C. This mixture is then cleaned to separate the larger particles from the solution using a centrifuge. The resulting solution is an 8% by weight sol containing 250 to 300 nm particles of boehmite.

The base powder used is VERSAL™ 250 alumina, a product of UOP LLC. The Versa 250 powder is pseudoboehmite and has a 320 $m^2$/g surface area, according to the vendor. The powder is calcined at 1100° C. for 4 hours. A 60 wt % slurry is made in a milling jar using 5 mm diameter TZP zirconia grinding media and 18MΩ water. The pH is adjusted and maintained at pH 5 by adding nitric acid periodically during milling. The slurry is milled until the median particle size is approximately 1 μm.

PVA (DuPont Elvanol® 75-15) is dissolved in water to make a 20% by weight solution of binder. The powder is slowly added to 120° C. water and stirred at 250 rpm to aid dissolution. The solution is then coarsely filtered.

The support structure is an 800 nm nominal pore size, 19-channel alumina porous support structure, manufactured by Inopor GmbH. The coating is deposited on the inner diameter of the channels using recirculating flow under a controlled backpressure. The feed slurry comprises the following ingredients: 620 ml of the boehmite solution, 740 ml of the VERSAL™ 250 alumina slurry, 1570 ml of the 20% PVA solution, and 2270 ml of excess water. These ingredients are combined using an agitating mixer, and pumped through the body of the support structure. The coating slurry pressure is 15 psi, at a flow rate of 225 ml/min and a time of 6 minutes. Once the coating cycle is completed, the remaining coating slurry is drained using a vacuum assisted process. The membranes are then dried in a room temperature, 80% R.H. chamber for 72 hours. Finally, the dried coating is thermally processed at 600° C. for 4 hours.

Example 2

The boehmite sol is prepared using a hydrolysis/condensation reaction. High purity water (11.4 liters) is heated to 85° C. Next 1.8 liters of 97% alumina tri-sec-butoxide, (ATSB) is slowly added drop wise to the hot water. The period of time for the addition is 1 hour 45 minutes. The mixture is allowed to reflux at 90° C. for 2 hours. The mixture is then peptized using 35 ml of 1N Nitric acid added directly to the solution. The peptization process occurs during a 12-hour reflux at 95° C. This mixture is then cleaned to separate the larger particles from the solution using a centrifuge. The resulting solution is an 8% by weight sol containing 500-800 nm particles of boehmite.

The base powder used is TM-DAR, a product of Taimei Chemicals Co., LTD. The TM-DAR powder is alpha-alumina and has a 14.5 $m^2$/g surface area, according to the vendor. A 70 wt % slurry is made in a milling jar using 5 mm diameter TZP zirconia grinding media and 18MΩ water. The pH is adjusted and maintained at pH 4 by adding nitric acid periodically during milling. The slurry is milled until the median particle size is approximately 300 nm.

PVA (DuPont Elvanol® 75-15) is dissolved in water to make a 20% by weight solution of binder. The powder is slowly added to 120° C. water and stirred at 250 rpm to aid dissolution. The solution is then coarsely filtered.

The support structure is an 800 nm nominal pore size, 19-channel alumina porous support structure, manufactured by Inopor GmbH. The coating is deposited on the inner diameter of the channels using recirculating flow under a controlled backpressure. The feed slurry comprises the following ingredients: 2890 ml of the boehmite solution, 850 ml of the TM-DAR alumina slurry, 816 ml of the 20% PVA solution, and 644 ml of excess water. These ingredients are combined using an agitating mixer, and pumped through the body of the support structure. The coating slurry pressure is 5 psi, at a flow rate of 375 ml/min and a time of 20 minutes. Once the coating cycle is completed, the remaining coating slurry is drained using a vacuum assisted process. The membranes are then dried in a room temperature, 80% R.H. chamber for 72 hours. Finally, the dried coating is thermally processed at 600° C. for 4 hours.

Example 3

The boehmite sol is prepared using a hydrolysis/condensation reaction. High purity water (11.4 liters) is heated to 85° C. Next 1.8 liters of 97% alumina tri-sec-butoxide, (ATSB) is slowly added drop wise to the hot water. The period of time for the addition is 1 hour 45 minutes. The mixture is allowed to reflux at 90° C. for 2 hours. The mixture is then peptized using 350 ml of 1N Nitric acid added directly to the solution. The peptization process occurs during a 12-hour reflux at 95° C. This mixture is then cleaned to separate the larger particles from the solution using a centrifuge. The resulting solution is an 8% by weight sol containing 60-70 nm particles of boehmite.

The base powder used is CATAPAL 200. The CATAPAL 200 powder is boehmite and has a 100 $m^2/g$ surface area, according to the vendor. The powder is calcined at 800° C. for 4 hours. A 20 wt % slurry is made in a milling jar using 5 mm diameter TZP zirconia grinding media and 18MΩ water. The pH is adjusted and maintained at pH 4 by adding nitric acid periodically during milling. The slurry is milled until the median particle size is approximately 2 μms.

PVA (DuPont Elvanol® 75-15) is dissolved in water to make a 20% by weight solution of binder. The powder is slowly added to 120° C. water and stirred at 250 rpm to aid dissolution. The solution is then coarsely filtered.

The support structure is an 800 nm nominal pore size, single channel alumina porous support structure (InoCep® M800), manufactured by Hyflux LTD. The coating is deposited on the inner diameter of the channel using recirculating flow under a controlled backpressure. The feed slurry comprises the following ingredients: 227 ml of the boehmite solution, 1674 ml of the CATAPAL 200 alumina slurry, 2527 ml of the 20% PVA solution, and 772 ml of excess water. These ingredients are combined using an agitating mixer, and pumped through the body of the support structure. The coating slurry pressure is 15 psi, at a flow rate of 60 ml/min and a time of 10 minutes. Once the coating cycle is completed, the remaining coating slurry is drained using a vacuum assisted process. The membranes are then dried in a room temperature, 80% R.H. chamber for 72 hours. Finally, the dried coating is thermally processed at 500° C. for 4 hours.

Example 4

The boehmite sol is prepared using a hydrolysis/condensation reaction. High purity water (11.4 liters) is heated to 85° C. Next 950 millliters of 97% alumina tri-sec-butoxide, (ATSB) is slowly added drop wise to the hot water. The period of time for the addition is 1 hour 45 minutes. The mixture is allowed to reflux at 90° C. for 2 hours. The mixture is then peptized using 120 ml of 1N Nitric acid added directly to the solution. The peptization process occurs during a 12-hour reflux at 95° C. This mixture is then cleaned to separate the larger particles from the solution using a centrifuge. The resulting solution is an 8% by weight sol containing 130-160 nm particles of boehmite.

The base powder used is VERSAL™ B alumina, a product of UOP LLC. The VERSAL™ B powder is bayerite and has a 370 $m^2/g$ surface area, according to the vendor. The powder is calcined at 1400° C. for 4 hours. A 25 wt % slurry is made in a milling jar using 5 mm diameter TZP zirconia grinding media and 18MΩ water. The pH is adjusted and maintained at pH 5 by adding nitric acid periodically during milling. The slurry is milled until the median particle size is approximately 1 μm.

PVA (DuPont Elvanol® 75-15) is dissolved in water to make a 20% by weight solution of binder. The powder is slowly added to 120° C. water and stirred at 250 rpm to aid dissolution. The solution is then coarsely filtered.

The support structure is an 200 nm, single channel alumina porous support structure (InoCep® M800), manufactured by Hyflux LTD. The coating is deposited on the inner diameter of the channel using recirculating flow under a controlled backpressure. The feed slurry comprises the following ingredients: 1590 ml of the boehmite solution, 3160 ml of the CATAPAL 200 alumina slurry, 450 ml of the 20% PVA solution. These ingredients are combined using an agitating mixer, and pumped through the body of the support structure. The coating slurry pressure is 20 psi, at a flow rate of 40 ml/min and a time of 4 minutes. Once the coating cycle is completed, the remaining coating slurry is drained using a vacuum assisted process. The membranes are then dried in a room temperature, 80% R.H. chamber for 72 hours. Finally, the dried coating is thermally processed at 800° C. for 4 hours.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A process for fabricating a defect-free ceramic membrane comprised of a ceramic membrane comprised of a porous support, at least one intermediate layer disposed on the porous support, and an outermost filtration layer comprised of alumina particles having a multi-modal size distribution disposed on the intermediate layer, said process comprising
    providing a ceramic membrane base having at least one open channel therewithin, wherein the ceramic membrane base is comprised of a porous support and at least one intermediate layer on the porous support,
    preparing a boehmite sol by hydrolyzing an aluminum alkoxide to form a hydrolysis product, and combining the hydrolysis product with a peptizing agent;
    preparing a colloidal suspension of porous alumina particles;
    preparing a coating slurry by combining the boehmite sol with the colloidal suspension;
    depositing the coating slurry onto the intermediate layer to form a coating thereon; and
    sintering the ceramic membrane base having the coating thereon at a temperature of about 400° C. to 800° C., thereby forming the outermost filtration layer comprised of alumina particles having a multi-modal size distribution,
    wherein the multi-modal size distribution of alumina particles comprises a first population of porous alumina particles and a second population of alumina particles disposed within interstices between the particles of the first population; the second population of alumina particles having a median particle size ranging from about 5 to about 500 nm; and the first population of alumina particles having a median particle size of less than about 100 times the median particle size of the second population of particles.

2. A process according to claim 1, wherein the depositing the coating slurry comprises pumping the coating slurry through channels of the membrane.

3. A process according to claim 1, wherein the coating slurry is pumped through the at least one channel at a rate ranging from 50 to 500 ml/min.

4. A process according to claim 1, wherein the coating slurry is pumped through the at least one channel at a pressure ranging from about 5 to about 50 psi.

5. A process according to claim 1, wherein the coating slurry is pumped through the at least one channel for a time ranging from about 2 to about 30 minutes.

6. A process according to claim 1, wherein the temperature ranges from about 450° C. to about 600° C.

7. A process according to claim 1, wherein the filtration layer comprises a continuous porous alumina layer having a maximum nominal pore size ranging from about 100 nm to about 800 nm.

8. A process according to claim 7, wherein the porous alumina layer has a minimum pore size ranging from about 2 nm to about 10 nm.

9. A process according to claim 7, wherein thickness of the porous alumina layer ranges from about 3 μm to about 21 μm.

10. A process according to claim 1, wherein volume percent of the first population of particles is less than about 30 percent of the total volume of the first and second populations of particles.

11. A process according to claim 1, wherein median particle size of the second population of particles ranges from about 50 nm to about 300 nm.

12. A process according to claim 1, wherein median particle size of the first population of particles is less than about ten times the median particle size of the second population of particles.

13. A process according to claim 1, wherein median particle size of the first population of particles ranges from about 300 nm to about 2000 nm.

14. A process according to claim 1, wherein the alumina particles of the second population comprise gamma-alumina.

15. The process of claim 1 wherein the porous support has a nominal pore size of less than about 1 μm.

16. A process for fabricating a ceramic membrane comprised of a porous support and a coating on the outermost surface of the ceramic membrane wherein the coating is comprised of alumina particles having a multi-modal size distribution, said process comprising providing a porous support having at least one inner channel extending therethrough and having surfaces defined by porous walls;

preparing a boehmite sol by hydrolyzing an aluminum alkoxide to form a hydrolysis product, and combining the hydrolysis product with a peptizing agent;

preparing a colloidal suspension of porous alumina particles;

preparing a coating slurry by combining the boehmite sol with the colloidal suspension;

depositing the coating slurry on surfaces of the porous support and the at least one inner channel to form coated surfaces thereon; and sintering the coated surfaces at a temperature ranging from about 400° C. to 800° C. to form the outermost surface of the ceramic membrane comprised of alumina particles having a multi-modal size distribution, wherein the multi-modal size distribution of alumina particles comprises a first population of porous alumina particles and a second population of alumina particles disposed within interstices between the particles of the first population; the second population of alumina particles having a median particle size ranging from about 5 to about 500 nm; and the first population of alumina particles having a median particle size of less than about 100 times the median particle size of the second population of particles.

17. A process according to claim 16, wherein the coating slurry additionally comprises a polymeric binder.

18. A process according to claim 17, wherein the polymeric binder is polyvinyl alcohol.

19. A process according to claim 16, wherein the peptizing agent is nitric acid.

20. A process according to claim 16, wherein particle size of the boehmite sol ranges from about 50 nm to about 500 nm.

21. A process according to claim 16, wherein particle size of the boehmite sol ranges from about 200 nm to about 300 nm.

22. A process according to claim 16, wherein the porous alumina particles are prepared by calcining a porous alumina powder at a temperature ranging from about 800° C. to about 1400° C. to yield a calcined powder.

23. A process according to claim 22, additionally comprising milling the calcined powder with water at a pH of less than about 8.

* * * * *